United States Patent [19]

Springer et al.

[11] Patent Number: 5,015,961
[45] Date of Patent: May 14, 1991

[54] FREQUENCY SHIFT DEMODULATOR

[75] Inventors: Robert E. Springer; George F. Hafer; Everett A. Gilbert, all of Montrose, Colo.

[73] Assignee: Da-Tel Research Company, Incorporated, Montrose, Colo.

[21] Appl. No.: 562,236

[22] Filed: Aug. 3, 1990

[51] Int. Cl.[5] .............................................. H03D 3/26
[52] U.S. Cl. .................................... 329/300; 329/318; 329/321; 329/337; 375/80; 375/88; 375/102
[58] Field of Search ................ 329/300, 303, 318, 321, 329/328, 337, 344; 375/45, 80, 82, 88, 99, 102, 103

[56] References Cited

U.S. PATENT DOCUMENTS 4,472,816 9/1984 Thompson ...................... 329/300 X Primary Examiner—David Mis

[57] ABSTRACT

The invention improves the ability of the FS demodulator-circuit of an FS digital transmission system so as to withstand noise with low error count. The invention uses two different types of all pass networks and a phase measuring circuit to average random noise and enhance the desired FS frequencies.

2 Claims, 2 Drawing Sheets

FREQUENCY SHIFT DEMODULATOR

This invention relates to the transmission of digital signals through a communication system in which the carrier frequency is modulated between two frequencies and commonly termed frequency shift. Specifically, the invention applies to the demodulator circuits that follow the channel filtering in a frequency shift (FS) receiver.

In the conventional FS receiver, the channel filter is followed by a limiter circuit, a tuned LC discriminator and a rectifier-filter circuit whose voltage output changes sharply with frequency. The carrier frequency and its harmonics are filtered from the discriminator response. The limiter circuit is an over-driven amplifier of high gain. As long as noise voltages do not exceed the carrier voltage at any instant, the carrier captures the limiter and the circuits operate relatively unaffected by noise over large changes in carrier signal level. When noise peaks exceed the carrier signal, the limiter will be captured by the noise and error pulses output from the demodulator circuits regardless of the design of subsequent circuitry. In our invention we first treat the signal with linear networks and then limit the signal.

Our invention operates with fewer errors due to noise by first applying the FS carrier with noise from the channel filter to a unique linear network whose two outputs have phase shifts of 180 degrees between them at the carrier extremes and with averages and suppresses the random noise signal peaks. Both voltage outputs are then amplified to a square wave and applied to a phase sensitive circuit followed by a low-pass filter to remove the carrier and its harmonics. The limiting amplifiers allow the circuit to operate over a large range of signal levels.

The basic object of our invention is to improve performance of conventional FS receivers in the presence of noise. One objective of this invention is to operate on an FS modulated signal with noise to average and absorb the random noise signals with linear networks before limiting to improve performance with noise. This and other objects and advantages will become apparent from the following description when taken with the accompanying drawings which illustrate one embodiment of the invention, it being understood that the description is not to be construed as restricting the scopes of the invention beyond the terms of the claims appended hereto.

In the drawings wherein like reference characters identify like parts in the views.

Figure 1:
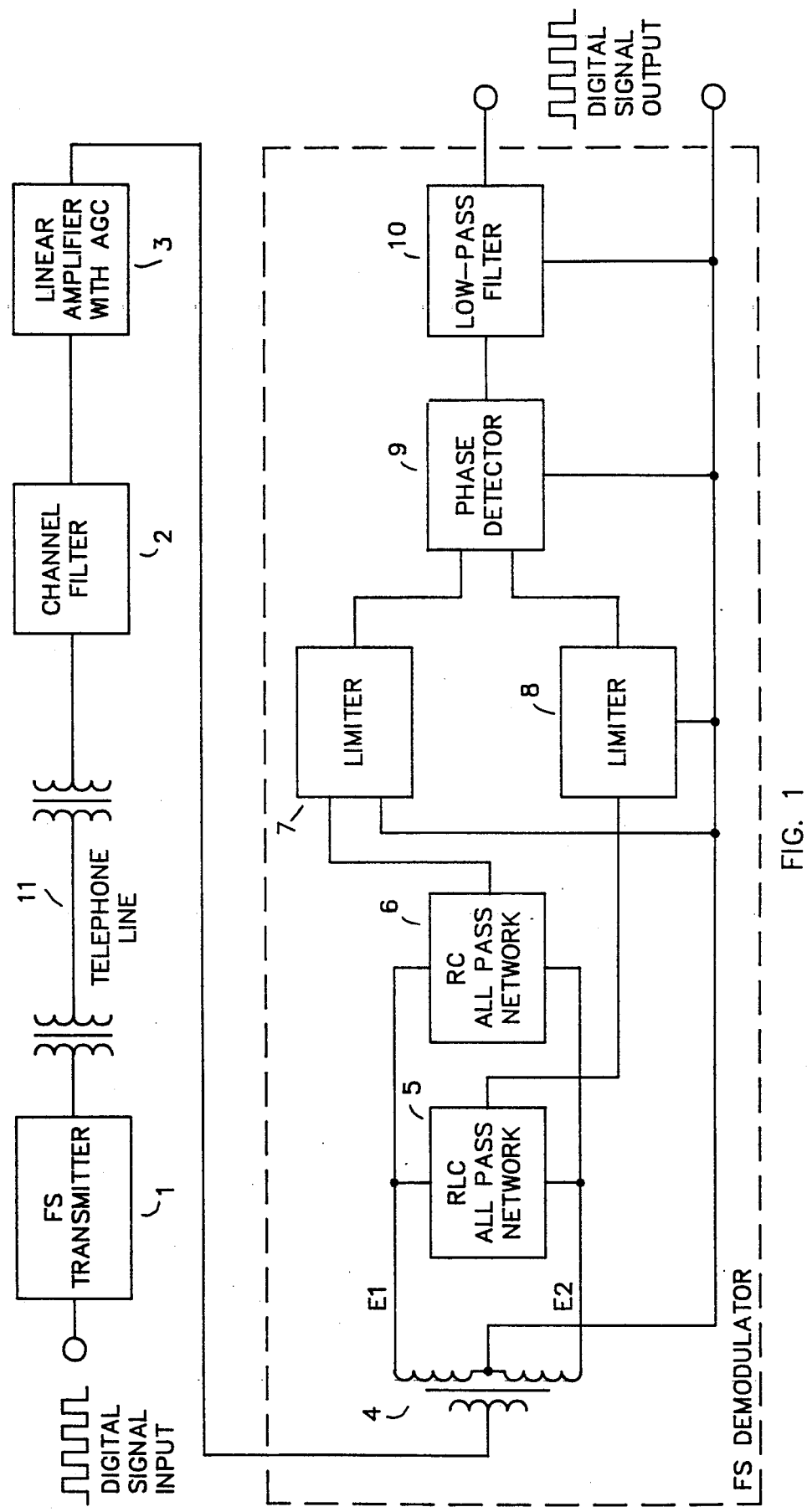
FIG. 1 is a block diagram of our Frequency Shift Demodulator circuit being used in a digital FS communication system.

Referring now to FIG. 1, a block diagram of a complete digital FS communication system, the digital signal is applied to the input of the FS transmitter 1. The transmitter outputs a higher frequency (mark) for a logic 1 input and lower frequency (space) for a 0 input. The average of the mark and space frequencies is known as the center frequency. Our invention operates most effectively in the narrower band case where the center frequency is 3 to 40 times the difference between mark and space frequency. This difference is better known as the frequency shift of the transmitter.

The FS modulator carrier output voltage is applied to a telephone line 11 or other communication network and transmitted to the FS receiver where a channel filter 2 is used to separate the signal from other signals on the line. The center frequency of this filter is the same as the transmitter's center frequency and the filter's bandwidth is usually the same as the frequency shift so as to pass both mark and space frequency. The maximum practical data rate of the system given in bits per second is numerically the same as the frequency shift or the bandwidth in hertz.

The amplifier 3 reproduces, without distortion, the signal output of the channel filter with noise at a convenient level. This amplifier is provided with an automatic gain control that fixes its output at a standardized level for input to the channel filter of $-40$ to $-10$ dBm.

Amplifier 3 drives Transformer 4 which has a center tapped secondary. This center tap is grounded providing two voltages, E1 and E2, which are 180 dergrees apart in phase. An op-amp can be used in place of the transformer to obtain two voltages 180 degrees out of phase and referenced to the circuit ground.

The voltage E1 and E2 drive all pass networks 5 and 6. All pass networks are characterized by passing all frequencies without changing amplitude. They do shift the phase of the applied signals. The all pass network 5 consists of a resistance, inductance and capacitor. The capacitor resonates in parallel with the inductance and at the center frequency of the channel. Considering E1 as the reference phase, the component values can be calculated so that the output phase shifts from 90 degrees through 180 degrees to 270 degrees for a change in frequency from mark through center frequency to space. The noise energy present in the signal is random and averages across the bandwidth, a great advantage over the conventional FS system using a limiting amplifier directly after the channel filter which is captured by peak noise voltages.

All pass network 6 consists of a resistance and capacitor. The phase of its output varies slowly with change of frequency, permitting its output to be used as a reference phase. This network is connected into our invention so that the reference phase output of 6 and the output of 5 are in phase at the space frequency and 180 degrees out of phase at the mark frequency. Another phase relationship may be selected with equal or nearly equal results by reversing E1 and E2 on circuit 6.

The sine wave voltage of the reference phase from all pass network 6 is connected to the input of limiter 7 to square the wave and allow operation with changing signal levels. The sine wave voltage from all pass network 5 with the 180 degree shift in phase between mark and space is connected to limiter 8. The square wave outputs from the limiters are connected to the phase detector 9 and the phase angle measured. The low pass filter 10 removes the carrier frequency from the output leaving the digital signal.

Figure 2:
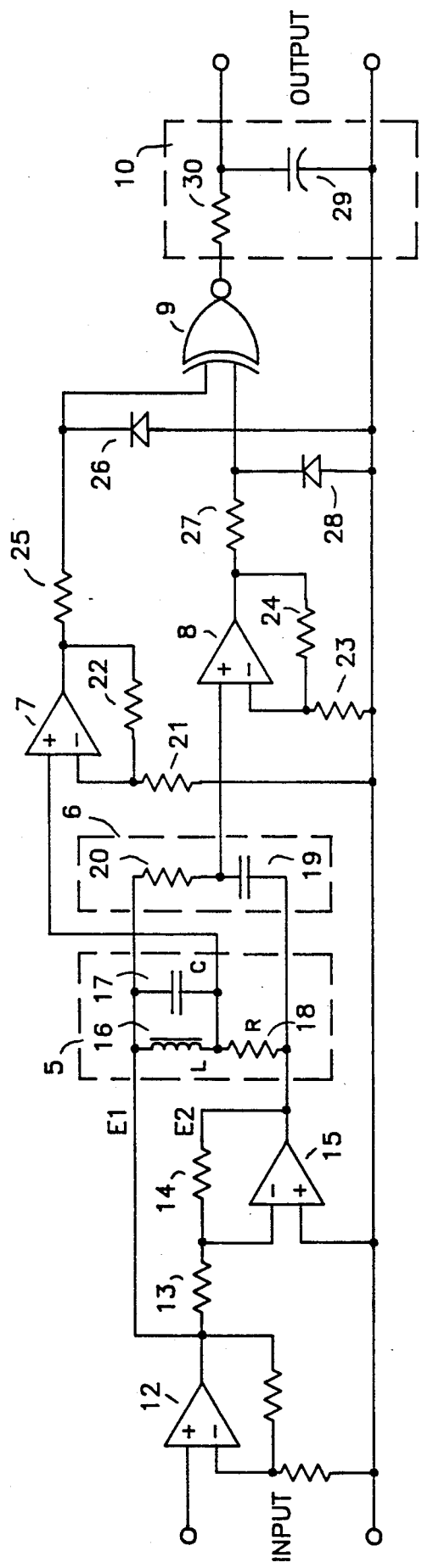
FIG. 2 is a diagram showing the component parts of the Frequency Shift Demodulator and the details of a practical embodiment of our invention.

Refer to FIG. 2 for a detailed description of an embodiment of our invention that replaces transformer 4 with an inverting op-amp circuit and uses available low cost op-amps and logic circuits. Op-amp 12 is the output component of the linear amplifier 3 and drives our FS demodulator circuits with the amplified, undistorted output of the channel filter, including noise. Op-amp 15 with equal valued resistors 13 and 14 inverts the output voltage E1 of op-amp 12. Voltage E2 is equal to E1 and 180 degrees out of phase. The all pass network 5 consists of an inductance 16 and a parallel capacitor 17 connected with a driving resistor 18. Observing that the network is connected between E1 and E2 and the junction between the resistor 18 and the resonant circuit 16, 17 is the output, the all pass characteristic can be checked. At a very low frequency the reactance of inductance 16 is near zero, and the output is E1. At a very high frequency the reactance of capacitor 17 is near zero, and the output is connected again to E1 indicating a total of 360 degrees phase shift in the network.

At the resonant frequency of the inductance 16 and capacitor 17, which is also the center frequency of the FS channel, the impedance is very high across the parallel network. The output lead is connected through the resistor 18 to E2. This shows that the output phase difference between E1 and E2 is 180 degrees at center frequency.

The op-amp 7 with resistors 21 and 22 form a high gain, non-inverting limiter circuit that squares the sine wave output of the all pass network 5. Likewise, op-amp 8, with resistor 23 and 24, form a high gain, non-inverting limiter circuit that squares the output of all pass network 6.

Resistor 25 with diode 26 and resistor 27 with diode 28 removes the negative going portions of the square wave outputs of limiter 7 and 8 to meet the requirements of the inputs of the exclusive nor logic circuit 9. Circuit 9 measures the phase difference between the square wave outputs of limiter 7 and 8. The average dc voltage in our invention at the output of 9 is zero volts at mark frequency, 6 volts at center frequency and +12 volts at space frequency. Resistor 30 and capacitor 29 filter the FS carrier frequencies and their harmonics from the signal leaving the digital signal as applied to the input of transmitter 1.

The ratio of resistor 18 to the reactance of capacitor C17 at the center frequency is equal to the ratio of the center frequency to the difference between mark and space frequency. The resistance 17 is equal to the reactance of capacitor 19 at the center frequency.

Having now described our invention in detail, various changes in the individual components and in the arrangement of the parts will become apparent to those skilled in the art. Changes of this character, which fall within the scope and spirit of the invention, are intended to be covered by the following claims.

We claim:

1. A demodulator circuit for frequency shift modulated carrier signals comprising and connected in order:
   a. a means to obtain two carrier signal terminals 180 degrees out of phase;
   b. an all pass network consisting of a resistor and a resonant inductance and capacitor connected across the two carrier signal terminals;
   c. an all pass network consisting of a resistor and capacitor also connected across the two carrier signal terminals;
   d. two limiting amplifiers processing the signal outputs of the above mentioned networks;
   e. logic circuit measuring the phase angle difference between the outputs of the two mentioned all pass networks;
   f. a low pass filter designed to remove the FS carrier frequencies from the logic circuit output and leave the digital message signal.

2. A demodulator for frequency shift modulated carrier signals comprising of and connected in order:
   a. a unity gain inverting op-amp drive circuit to obtain two carrier signal terminals 180 degrees out-of-phase;
   b. an all pass network consisting of a parallel resonant inductance and capacitor with a driving resistor, the inductance resonating with the capacitor at channel center frequency and connected across the two carrier signal terminals;
   c. an all pass network consisting of a series resistor and capacitor, the reactance of the capacitor at channel center frequency to be equal to the value of the resistor and connected across the two carrier signal terminals;
   d. two limiting amplifiers processing the signal outputs of the above-mentioned networks;
   e. an exclusive nor logic circuit to measure the phase difference between the output of the two limiters;
   f. a low pass filter consisting of a resistor and capacitor to remove FS carrier frequencies from the output of the above mentioned logic circuit and leave the digital message signal.

* * * * *